US011032668B2

(12) United States Patent
Sant et al.

(10) Patent No.: US 11,032,668 B2
(45) Date of Patent: Jun. 8, 2021

(54) PRECISE INDOOR LOCALIZATION AND TRACKING OF ELECTRONIC DEVICES

(71) Applicant: Apple Inc., Cupertino, CA (US)

(72) Inventors: Amit S. Sant, Santa Clara, CA (US);
Alejandro J. Marquez, Sunnyvale, CA (US); Indranil S. Sen, Cupertino, CA (US); Mohit Narang, Cupertino, CA (US); Shang-Te Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 16/511,756

(22) Filed: Jul. 15, 2019

(65) Prior Publication Data

US 2019/0342707 A1 Nov. 7, 2019

Related U.S. Application Data

(62) Division of application No. 15/619,171, filed on Jun. 9, 2017, now Pat. No. 10,356,553.

(60) Provisional application No. 62/399,145, filed on Sep. 23, 2016.

(51) Int. Cl.
| | |
|---|---|
| *H04W 4/02* | (2018.01) |
| *H04W 4/029* | (2018.01) |
| *G01S 5/00* | (2006.01) |
| *H04W 64/00* | (2009.01) |
| *G01S 5/12* | (2006.01) |
| *G01S 5/14* | (2006.01) |
| *H04W 88/02* | (2009.01) |
| *H04W 4/024* | (2018.01) |
| *H04W 4/33* | (2018.01) |

(52) U.S. Cl.
CPC .............. *H04W 4/023* (2013.01); *G01S 5/00* (2013.01); *G01S 5/12* (2013.01); *G01S 5/14* (2013.01); *H04W 4/026* (2013.01); *H04W 4/029* (2018.02); *H04W 64/00* (2013.01); *H04W 4/024* (2018.02); *H04W 4/33* (2018.02); *H04W 88/02* (2013.01)

(58) Field of Classification Search
CPC ....... H04W 64/00; H04W 4/023; H04W 4/02; G01S 5/021; G01S 5/02
See application file for complete search history.

(56) References Cited

U.S. PATENT DOCUMENTS

| | | | | |
|---|---|---|---|---|
| 8,433,337 | B2 * | 4/2013 | Chin ..................... | G01S 5/0205 455/456.1 |
| 8,933,841 | B2 | 1/2015 | Valaee et al. | |
| 9,167,386 | B2 * | 10/2015 | Valaee .................. | H04W 4/025 |
| 9,182,494 | B2 | 11/2015 | Vartanian et al. | |
| 9,723,510 | B1 * | 8/2017 | Beluri ................... | H04W 24/02 |

(Continued)

*Primary Examiner* — Dung Hong
(74) *Attorney, Agent, or Firm* — Fletcher Yoder PC

(57) ABSTRACT

Methods and devices useful in performing precise indoor localization and tracking are provided. By way of example, a method includes locating and tracking, via a first wireless electronic device, a plurality of other wireless electronic devices within an indoor environment. The method also includes performing front-back detection, performing stationary node detection, performing angle of arrival (AoA) error correction, and performing field of view (FOV) filtering. Performing indoor localization and tracking of the plurality of other wireless electronic devices includes providing an indication of a physical location of the plurality of other wireless electronic devices within the indoor environment.

18 Claims, 14 Drawing Sheets

(56) References Cited

U.S. PATENT DOCUMENTS

| | | | |
|---|---|---|---|
| 10,356,553 B2* | 7/2019 | Sant | H04W 4/026 |
| 2007/0195005 A1* | 8/2007 | Schantz | H01Q 3/24 |
| | | | 343/876 |
| 2009/0017764 A1* | 1/2009 | Bonner | G06Q 20/208 |
| | | | 455/66.1 |
| 2011/0199255 A1* | 8/2011 | Murray | G01S 5/0226 |
| | | | 342/357.23 |
| 2012/0013508 A1* | 1/2012 | Bao | G01S 5/0263 |
| | | | 342/450 |
| 2012/0100868 A1* | 4/2012 | Kim | H04W 4/023 |
| | | | 455/456.1 |
| 2013/0029685 A1* | 1/2013 | Moshfeghi | G06Q 20/409 |
| | | | 455/456.1 |
| 2014/0080505 A1* | 3/2014 | Vannucci | G01S 5/0252 |
| | | | 455/456.1 |
| 2015/0133149 A1* | 5/2015 | Kim | H04W 64/00 |
| | | | 455/456.1 |
| 2015/0234033 A1* | 8/2015 | Jamieson | G01S 5/04 |
| | | | 455/456.1 |
| 2015/0326704 A1* | 11/2015 | Ko | H04M 1/72457 |
| | | | 455/456.3 |
| 2017/0099584 A1* | 4/2017 | Bhanot | H04L 61/6022 |
| 2018/0041868 A1* | 2/2018 | Gunnarsson | G01S 5/0036 |
| 2018/0227193 A1* | 8/2018 | Singamsetty | H04L 41/22 |

* cited by examiner

| DISTANCE FROM REFERENCE NODE | DISTANCE ACCELERATION VECTOR | FLIP NODES |
|---|---|---|
| INCREASES | +VE | YES |
| INCREASES | -VE | NO |
| DECREASES | +VE | NO |
| DECREASES | -VE | YES |

PRECISE INDOOR LOCALIZATION AND TRACKING OF ELECTRONIC DEVICES

CROSS REFERENCE TO RELATED APPLICATIONS

This application is a Divisional of and claims priority to U.S. application Ser. No. 15/619,171, entitled "Precise Indoor Localization and Tracking of Electronic Devices", filed Jun. 9, 2017, which is a Non-Provisional Patent Application of and claims priority to U.S. Provisional Patent Application No. 62/399,145, entitled "Precise Indoor Localization and Tracking of Electronic Devices", filed Sep. 23, 2016, both of which are herein incorporated by reference in their entireties and for all purposes.

BACKGROUND

The present disclosure relates generally to wireless electronic devices and, more particularly, to precise indoor localization and tracking of wireless electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers, or when coupled together as part of a single unit, transceivers, are commonly included in various electronic devices, and particularly, mobile electronic devices such as, for example, phones (e.g., mobile and cellular phones, cordless phones, personal assistance devices), computers (e.g., laptops, tablet computers), internet connectivity routers (e.g., Wi-Fi routers or modems), radios, televisions, wearable electronic devices (e.g., smartwatches, heartrate monitors, exercise wristbands) or any of various other stationary or handheld devices. Certain types of transceivers, known as wireless transceivers, may be used to generate and receive wireless signals to be transmitted and/or received by way of an antenna coupled to the transceiver. Specifically, the wireless transceiver is generally used to allow the mobile electronic devices to wirelessly communicate data over a network channel or other medium (e.g., air) to and from one or more external mobile electronic devices or other wireless electronic devices.

Indeed, as the worldwide usage of mobile and wearable electronic devices (e.g., mobile phones, tablet computers, smartwatches, and so forth) and in-home wireless electronic devices increases, so has the demand for location-based services using the mobile and wearable electronic devices and in-home wireless electronic devices. For example, in outside environments (e.g., outdoor environments), mobile and wearable electronic devices may employ global positioning systems (GPS) systems to provide location and navigation data wherever an unobstructed line of sight (LoS) channel is available between a number of GPS space satellites and the mobile and wearable electronic devices. Yet due to the requirement of the unobstructed LoS channels between GPS space satellites and the mobile and wearable electronic devices, GPS cannot provide accurate location and navigation data for indoor environments (e.g., inside of residential, commercial, or industrial buildings), and particularly not for distances less than 2 meters (m). Thus, a number of indoor positioning systems (IPS) have been developed in an attempt to provide at least approximate indoor localization and navigation.

For example, one such preeminent example of an IPS system may include a "fingerprinting" system, which may include a technique of developing a radio frequency (RF) map of particular areas of a location or environment based on predetermined received signal strength indicators (RSSI) values emanating, for example, from a Wi-Fi connected device or other wireless connectivity "hotspots." However, "fingerprinting" systems most often includes an offline calibration or training phase in which RSSI values must be collected for hundreds if not thousands of Wi-Fi connected devices or other wireless connectivity "hotspots" to achieve even marginal localization accuracy. Furthermore, certain real-time environmental conditions such as, for example, obstructions due to the presence of pedestrians, the opening and closing of doors, as well as variations in atmospheric conditions (e.g., humidity, temperature) may alter the RF signals and the resulting RSSI values. Moreover, the transceivers employed in many mobile and wearable electronic devices, as well as those in in-home electronic devices, may be subject to "front-back" ambiguity, or ambiguity with respect to a particular wireless electronic device determining whether a signal arrives at that particular wireless electronic device from the front or from the back of that particular wireless electronic device. Accordingly, it may be useful to provide methods and devices to improve indoor localization and tracking of wireless electronic devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in performing precise indoor localization and tracking of electronic devices. By way of example, a method includes locating and tracking, via a first wireless electronic device, a plurality of other wireless electronic devices within an indoor environment. The method also includes performing front-back detection, performing stationary node detection, performing angle of arrival (AoA) error correction, and performing field of view (FOV) filtering. Performing indoor localization and tracking of the plurality of other wireless electronic devices includes providing an indication of a physical location of the plurality of other wireless electronic devices within the indoor environment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
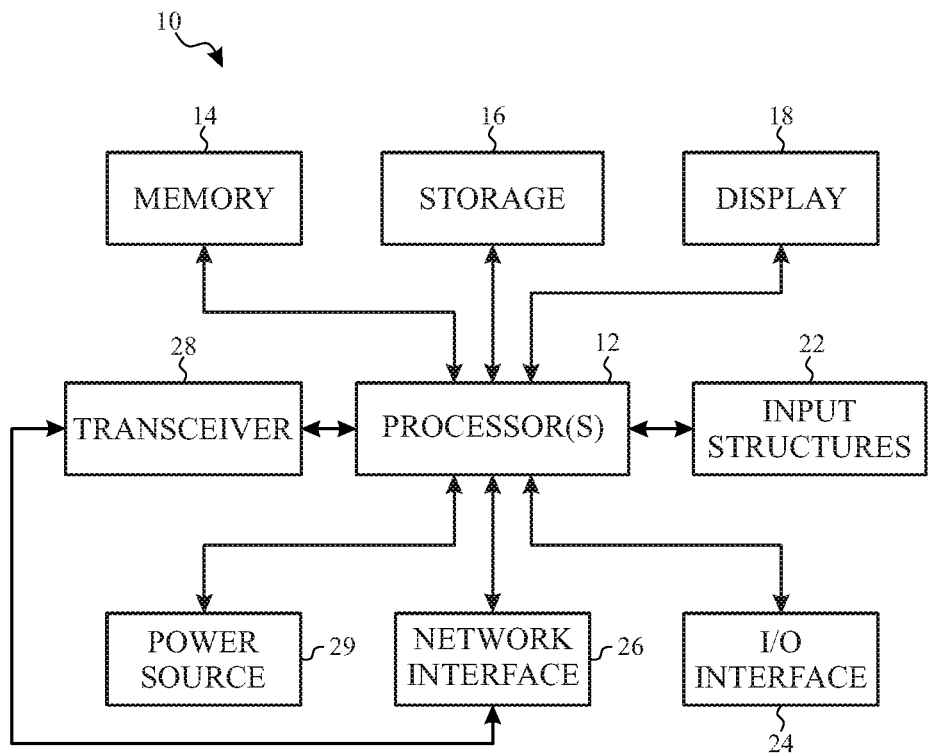
FIG. 1 is a schematic block diagram of an electronic device including a transceiver, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure generally relate to techniques of performing precise indoor localization and tracking of one or more wireless electronic devices (e.g., within an indoor environment or otherwise within a range of 1-10 meters). In certain embodiments, the present embodiments may include a precise indoor localization algorithm (PILA) that may be executed by one or more processors of an electronic device to generate a radio frequency (RF) map of a number of wireless electronic devices (e.g., which may be referred to herein as "nodes" of the RF map) within an indoor environment to determine the precise physical location (e.g., XY-coordinates or longitudinal and latitudinal coordinates generally within less than +−x meters of their actual location) of the wireless electronic devices within an indoor environment. Indeed, in some embodiments, the RF map may be generated based on range and angle of arrival (AoA) matrices calculated with respect to each of the number of wireless electronic devices from the perspective of the electronic device executing the PILA and with respect to each other of the number of wireless electronic devices.

In accordance with the present embodiments, based on the calculated range and AoA matrices and/or the calculated distance measurements based on acceleration, the one or more processors of the electronic device may iteratively adjust the RF map by reshaping and/or rotating the RF map (e.g., based on multi-dimensional scaling [MDS] and field of view [FOV]) to reduce and/or eliminate "front-back" ambiguity, "flip-node" ambiguity, out-of-bounds nodes, and so forth as the number of wireless electronic devices remain stationary and/or move with respect to each other electronic device within the indoor environment. In this way, the present embodiments may provide techniques to efficiently track and pinpoint the precise physical location of wireless electronic devices within indoor environments, or otherwise in any of various environments in which large-scale satellite systems such as, GPS, may be inaccurate and/or inefficient (e.g., within a distance range of 1-10 meters).

With the foregoing in mind, a general description of suitable electronic devices that may be useful in performing precise indoor localization and tracking of electronic devices will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, network interfaces 26, one or more transceivers 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

Figure 2:
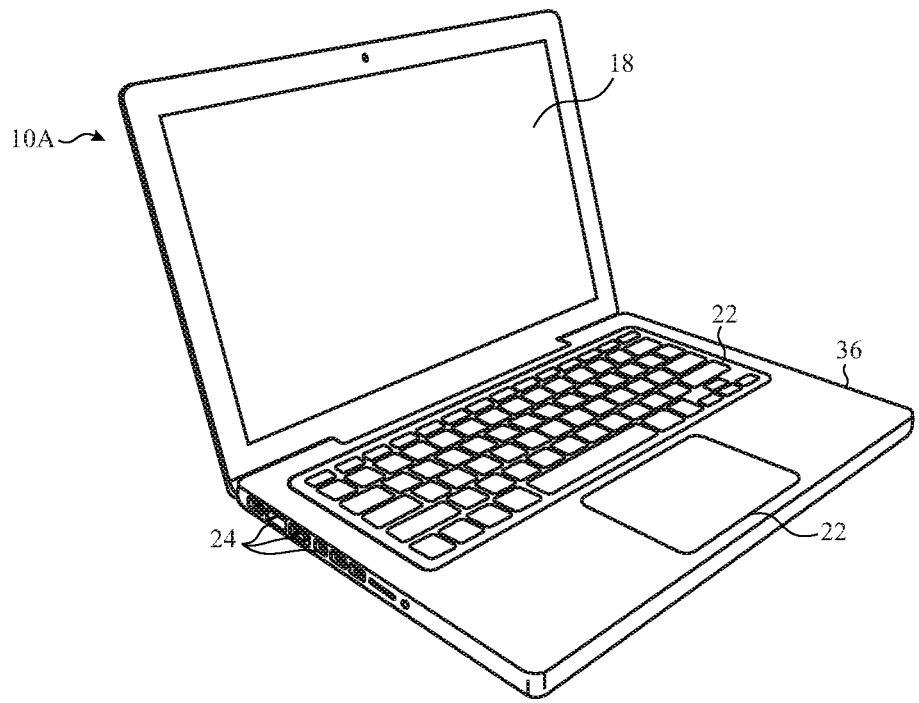
FIG. 2 is a perspective view of a notebook computer representing an embodiment of the electronic device of FIG. 1.
Figure 3:
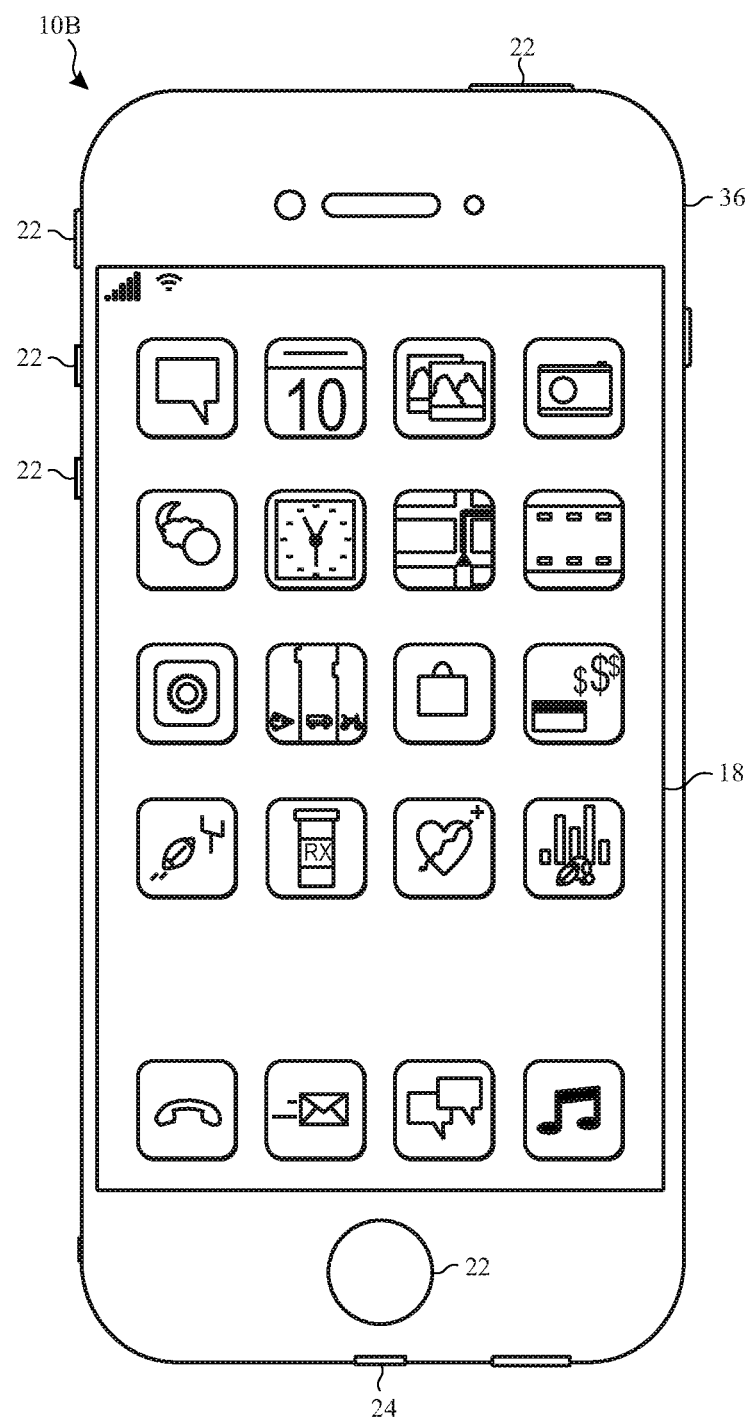
FIG. 3 is a front view of a hand-held device representing another embodiment of the electronic device of FIG. 1.
Figure 4:
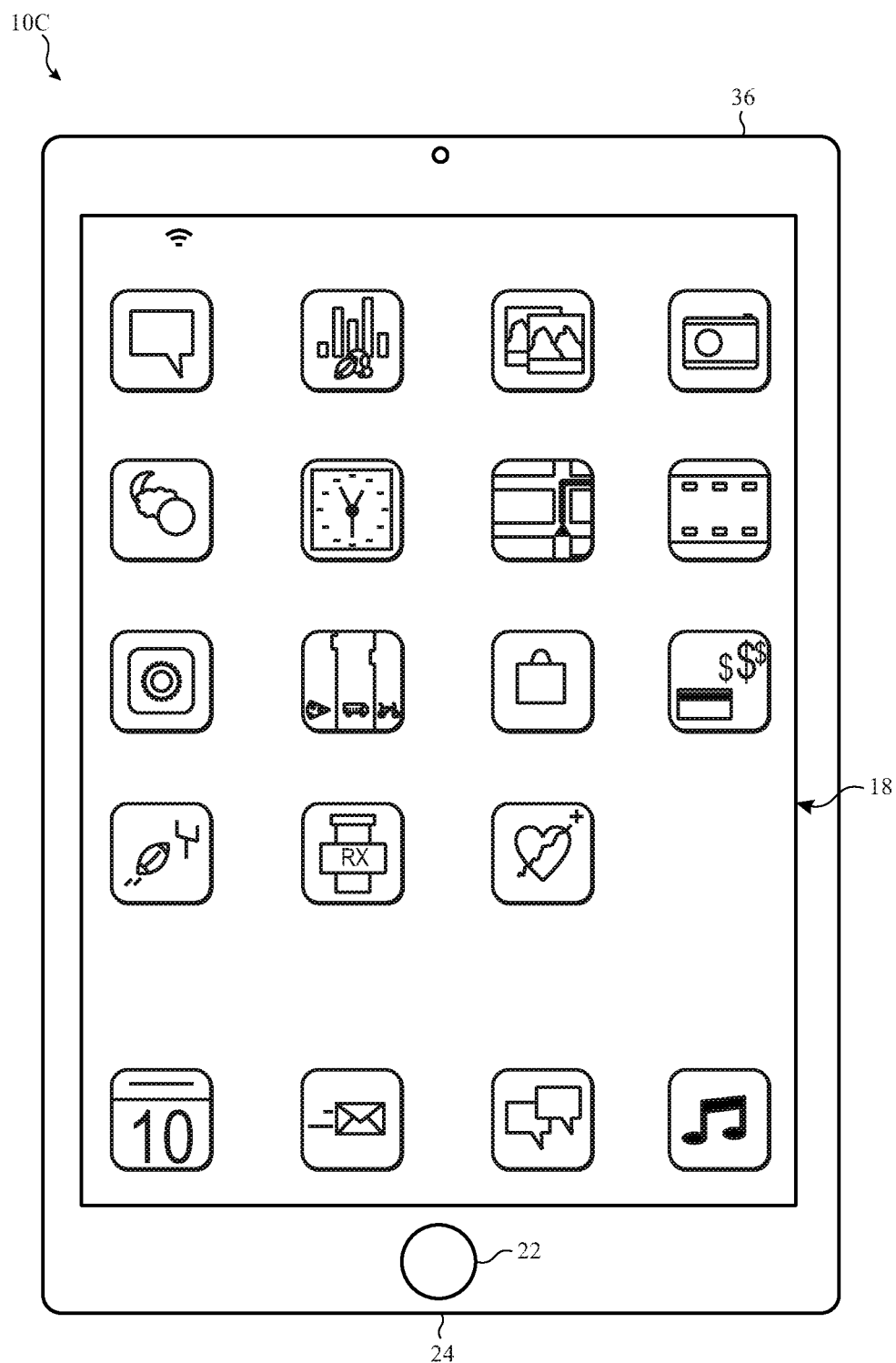
FIG. 4 is a front view of another hand-held device representing another embodiment of the electronic device of FIG. 1.
Figure 5:
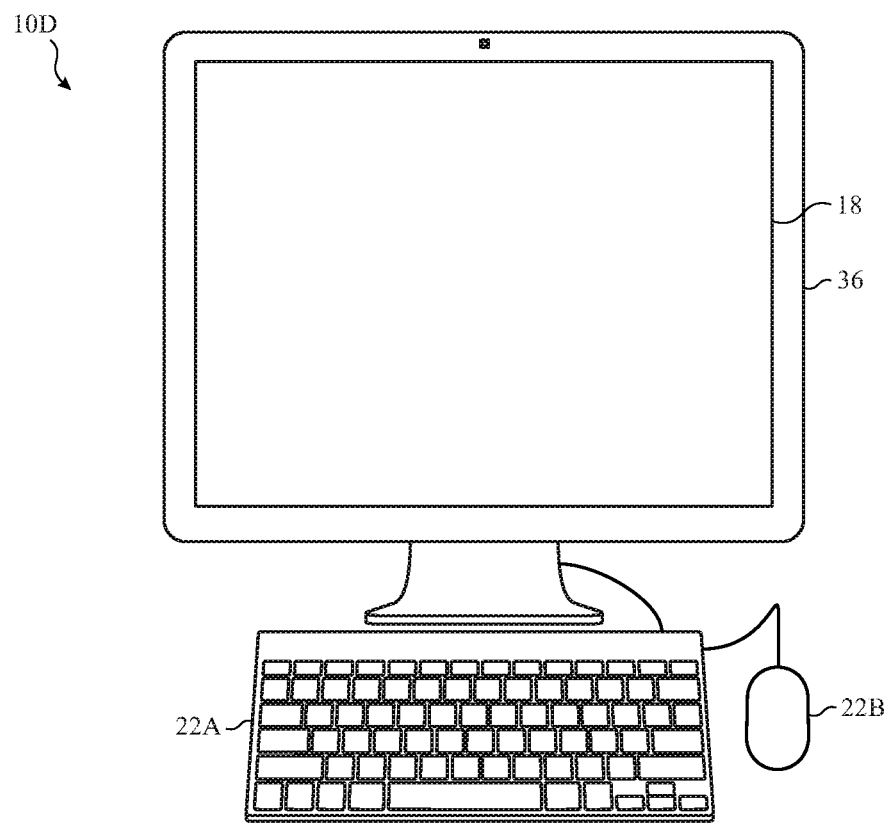
FIG. 5 is a front view of a desktop computer representing another embodiment of the electronic device of FIG. 1.
Figure 6:
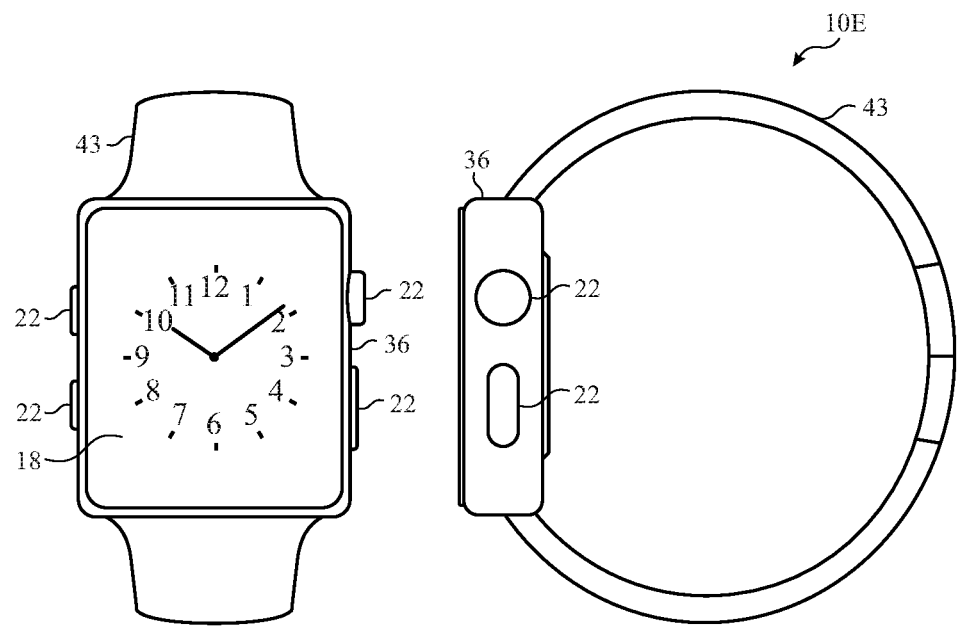
FIG. 6 is a front view and side view of a wearable electronic device representing another embodiment of the electronic device of FIG. 1.

By way of example, the electronic device 10 represented by the block diagram of FIG. 1 may be the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and/or other data processing circuitry of FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, 4th generation (4G) cellular network, long term evolution (LTE) cellular network, or long term evolution license assisted access (LTE-LAA) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE and LTE-LAA cellular networks), WiMAX networks, mobile WiMAX networks, ADSL and VDSL networks, DVB-T and DVB-H networks, UWB networks, and so forth. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an IO interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an i/O port for a hard wired connection for charging and/or content manipulation using a standard connector and protocol, such as the Lightning connector provided by Apple Inc., a universal service bus (USB), or other connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device OC may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
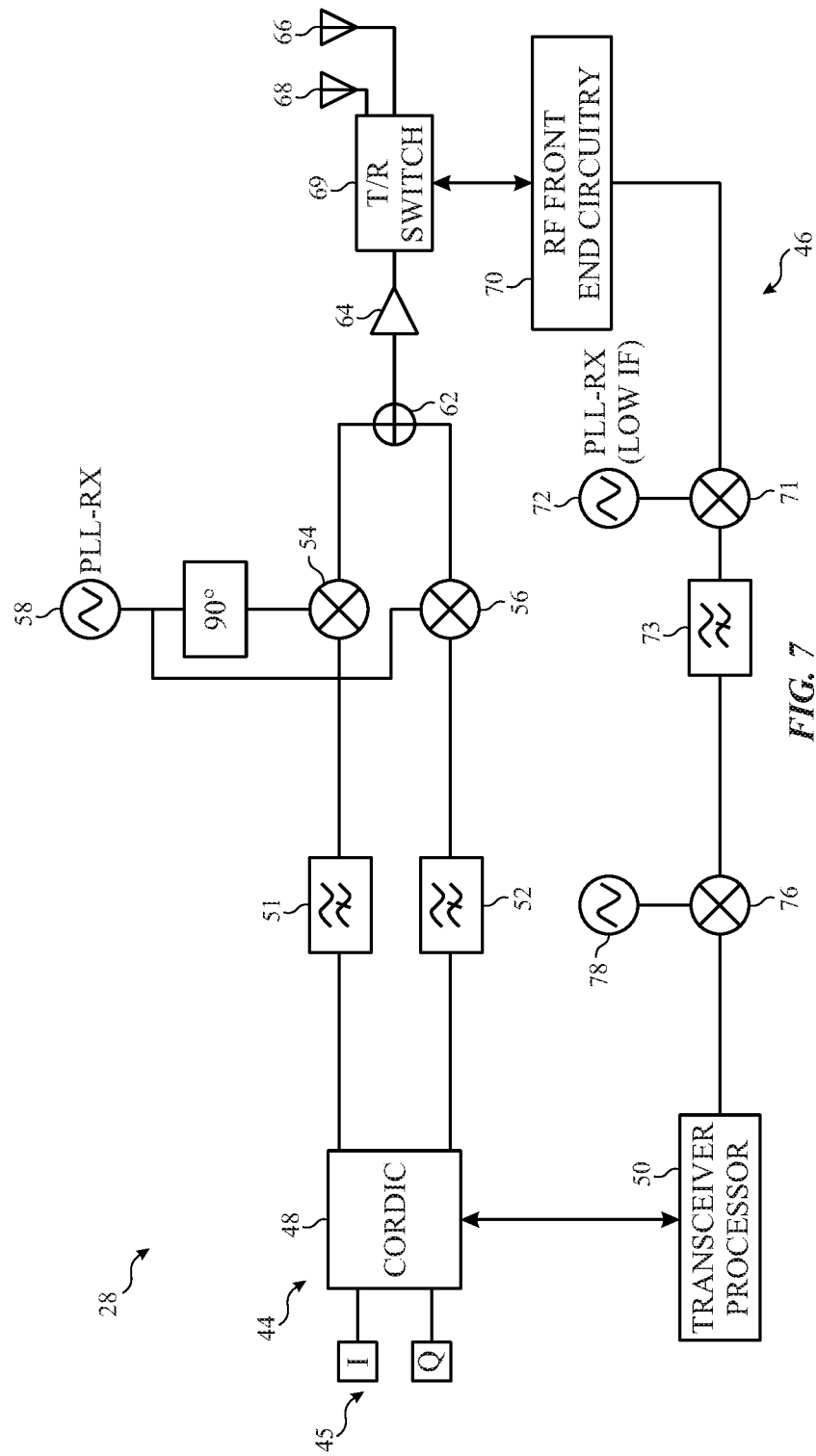
FIG. 7 is a schematic diagram of the transceiver included within the electronic device of FIG. 1, in accordance with an embodiment.

With the foregoing in mind, FIG. 7 depicts a schematic diagram of the transceiver 28. As illustrated, the transceiver 28 may include a transmitter 44 (e.g., transmitter path) and a receiver 46 (e.g., receiver path) coupled as part of a single unit. As depicted, the transmitter 44 may receive a signal 45 that may be initially modulated via a coordinate rotation digital computer (CORDIC) 48 that may, in some embodiments, be used to process individual Cartesian represented data symbols (e.g., OFDM symbols) into polar amplitude and phase components. In some embodiments, the CORDIC 48 may include a digital signal processor (DSP) or other processor architecture that may be used to process the incoming signal 45. In some embodiments, the CORDIC 48 may also communicate with a transceiver processor 50 (e.g., on-board processor) that may be used to process transmitted and/or received WLAN (e.g., Wi-Fi) and/or cellular (e.g., LTE) signals.

In certain embodiments, during operation, the transmitter 44 may receive a Cartesian coordinate represented signal 45, which may include, for example, data symbols encoded according to orthogonal I/Q vectors. Thus, when an I/Q signal is converted into an electromagnetic wave (e.g., radio frequency (RF) signal, microwave signal, millimeter wave signal), the conversion is generally linear as the I/Q may be frequency band-limited. The I/Q signals 45 may be then respectively passed to high pass filters (HPFs) 51 and 52, which may be provided to pass the high frequency components of the I/Q signals 45 and filter out the low frequency components. As further illustrated, the I/Q signals 45 may be then respectively passed to mixers 54 and 56, which may be used to mix (e.g., multiply or upconvert) the in-phase (I) component and the quadrature (Q) component of the I/Q signals 45.

In certain embodiments, as further illustrated in FIG. 7, a transmitter phase lock loop (PLL-TX) or oscillator 58 may be provided to generate 900 out of phase oscillation signals by which to mix the orthogonal in-phase (I) component and the quadrature (Q) component to generate a carrier frequency and/or radio frequency (RF) signal. The in-phase (I) component and the quadrature (Q) component signals may be then recombined via a summer 62, and then passed to a power amplifier (PA) 64 to amplify the summed signal, and to generate an electromagnetic signal (e.g., RF signal, microwave signal, millimeter wave signal) to be provided to antennas 66 and 68 (e.g., multiple input multiple output [MIMO] antennas) for transmission.

In some embodiments, the antennas 66 and 68 may include orthogonal UWB antennas, or any other of various antennas that may be useful in supporting increased field-of-view (FOV) coverage and efficient angle of arrival (AoA) detection. However, as will be further appreciated, because the transceiver 28 may include two antennas 66 and 68, the transceiver 28 may, in some embodiments, be susceptible to "front-back" ambiguity. In some embodiments, the antennas 66 and 68 may be included on the same integrated chip as the transceiver 28 architecture. However, in other embodiments, the antennas 66 and 68 may be fabricated as part of a separate chip and/or circuitry that may be coupled to the other circuitry components (e.g., PA 64) of the transceiver 28.

In certain embodiments, as previously noted, the transmitter 44 may be coupled together with the receiver 46. Thus, as illustrated, the transceiver 28 may further include a transmitter/receiver (T/R) switch 69 or other circulator device, which may be useful in routing signals from the transmitter 44 to the antennas 66 and 68 and routing signals received via the antennas 66 and 68 to the receiver 46 (e.g., receiver path of the transceiver 28). In certain embodiments, the T/R switch 69 may be coupled to RF front end circuitry 70, which may include one or more RF filters and similar circuitry used for filtering and pre-processing received and/or transmitted RF signals.

As further depicted in FIG. 7, during operation, the receiver 46 may receive RF signals (e.g., LTE and/or Wi-Fi signals) detected by the antennas 66 and 68. For example, as illustrated in FIG. 7, received signals may be received by the receiver 46. The received signals may be then passed to a mixer 71 (e.g., downconverter) to mix (e.g., multiply) the received signals with an IF signal (e.g., 10-20 megahertz (MHz) signal) provided by a receiver phase lock loop (PLL-RX) or oscillator 72.

In certain embodiments, as further illustrated in FIG. 7, the IF signal may be then passed to a low-pass filter 73, and then mixer 76 that may be used to mix (e.g., downconvert a second time) with a lower IF signal generated by an oscillator 78 (e.g., numerically controlled oscillator). The oscillator 78 may include any device that may be useful in generating an analog or discrete-time and/or frequency domain (e.g., digital domain) representation of a carrier frequency signal. The IF signal may be then passed to the transceiver processor 50 to be further processed and analyzed.

In certain embodiments, the electronic device 10 may be used to perform indoor localization and tracking. Indeed, certain IPS systems such as, "fingerprinting" may include a technique of developing a radio frequency (RF) map (e.g., radio map) of particular areas of a location or environment based on predetermined received signal strength indicators (RSSI) values emanating, for example, from a Wi-Fi connected device or other wireless connectivity "hotspots." However, "fingerprinting" systems most often include an offline calibration or training phase in which RSSI values must be collected for hundreds if not thousands of Wi-Fi connected devices or other wireless connectivity "hotspots" to achieve even marginal localization accuracy.

Furthermore, certain real-time environmental conditions such as, for example, obstructions due to the presence of pedestrians, the opening and closing of doors, as well as variations in atmospheric conditions (e.g., humidity, temperature) may degrade RF signals and affect the RSSI values. Moreover, the transceivers employed in many mobile and wearable electronic devices, as well as those in in-home electronic devices, may be subject to "front-back" ambiguity, or ambiguity with respect to a particular wireless electronic device determining whether a signal arrives at that particular wireless electronic device from the front or from the back of that particular wireless electronic device. Accordingly, in certain embodiments, as will be further appreciated with respect to FIGS. 8-22, it may be useful to provide techniques to perform precise indoor localization and tracking of one or more wireless electronic devices. It should be appreciated that, in certain embodiments, the present techniques (e.g., precise indoor localization algorithm [PILA]) may be performed by the processor(s) 12, the transceiver processor 50, or in conjunction between the processor(s) 12 and the transceiver 28.

Figure 8:
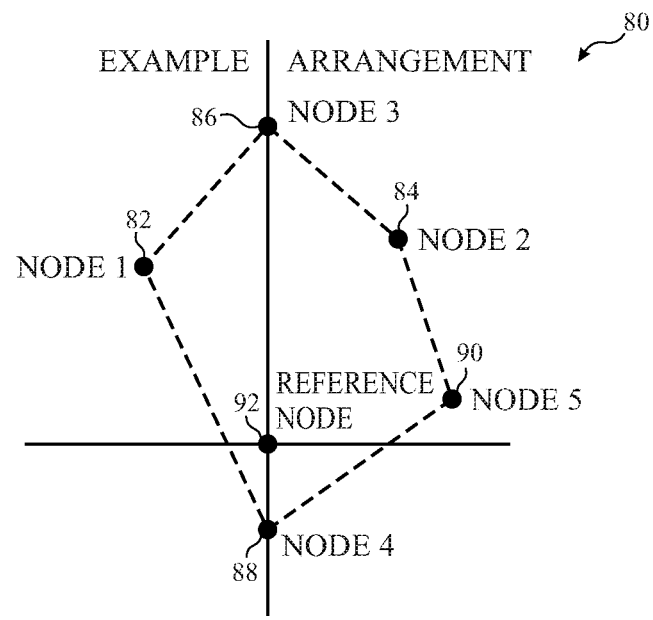
FIG. 8 is an example diagram of a radio frequency (RF) map, in accordance with an embodiment.

Turning now to FIG. 8, an example diagram of an RF map 80 (e.g., radio map) is illustrated. As depicted, the RF map 80 may include a number of nodes 82 (e.g., "Node 1"), 84 (e.g., "Node 2"), 86 (e.g., "Node 3"), 88 (e.g., "Node 4"), 90 (e.g., "Node 5"), and 92 (e.g., "Reference Node"). In certain embodiments, each of the nodes 82 (e.g., "Node 1"), 84 (e.g., "Node 2"), 86 (e.g., "Node 3"), 88 (e.g., "Node 4"), 90 (e.g., "Node 5") may represent any of various wireless electronic devices (e.g., mobile wireless electronic devices, in-home wireless devices, wearable wireless electronic devices, and so forth) that may be placed or situated within an indoor environment (e.g., inside of residential, commercial, or industrial buildings).

In one embodiment, each of the nodes 82 (e.g., "Node 1"), 84 (e.g., "Node 2"), 86 (e.g., "Node 3"), 88 (e.g., "Node 4"), 90 (e.g., "Node 5") may be connected to a WLAN (e.g., Wi-Fi, UWB, White-Fi, etc.) within the indoor environment (e.g., inside of residential, commercial, or industrial buildings), and may each include at least two antennas (e.g., similar to antennas 66 and 68 of the electronic device 10). Similarly, the node 92 (e.g., "Reference Node") may represent, for example, the electronic device 10 that may be used to generate one or more RF maps (e.g., radio maps) as part of the precise indoor localization and tracking techniques (e.g., indoor localization and tracking of nodes 82, 84, 86, 88, and 90) described herein.

The RF map 80 may illustrate an example layout of the nodes 1, 2, 3, 4, and 5. For example, the RF map 80 may illustrate the respective locations of the nodes 1, 2, 3, 4, and 5 corresponding to wireless electronic devices within an indoor environment. As previously noted, "front-back" ambiguity may disparage the ability of the node 92 (e.g., "Reference Node" or electronic device 10) to accurately resolve the actual location of the individuals nodes 1, 2, 3, 4, and 5.

Figure 9:
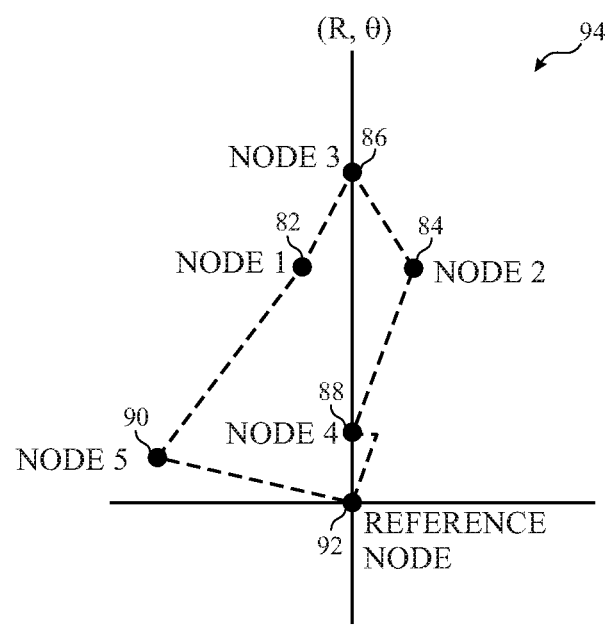
FIG. 9 is an example diagram of an RF map illustrating front-back ambiguity, in accordance with an embodiment.

For example, FIG. 9 illustrates an RF map 94 that depicts an example "front-back" ambiguity, as compared to the RF map 80 of FIG. 8. As depicted in FIG. 9, without the present techniques to be discussed herein, the node 92 (e.g., "Reference Node" or electronic device 10) may resolve the nodes 1, 2, 3, 4, and 5 as being positioned at an inaccurate place. For example, as depicted in the RF map 94 of FIG. 9, the node 1 and the node 2 are resolved as being significantly closer to each other (e.g., as compared to the node 1 and the node 2 of the RF map 80 of FIG. 8).

Similarly, the node 4 of the RF map 94 may be resolved as being located in a frontward position with respect to the node 92 ("Reference Node") as shown in FIG. 9, as opposed to the actual backside location with respect to the reference node as shown in FIG. 8. Specifically, the resolved location of the node 4 in the RF map 94 of FIG. 9 may illustrate an example of "front-back" ambiguity. As further depicted in the RF map 94 of FIG. 9, the node 5 may be resolved as being located on the left side of the reference node as shown in FIG. 9, as opposed to actually being on the right side of the reference node as shown in FIG. 8. The resolved location of the reference node in the RF map 94 of FIG. 9 may illustrate an example of "flip-node" ambiguity.

Figure 10:
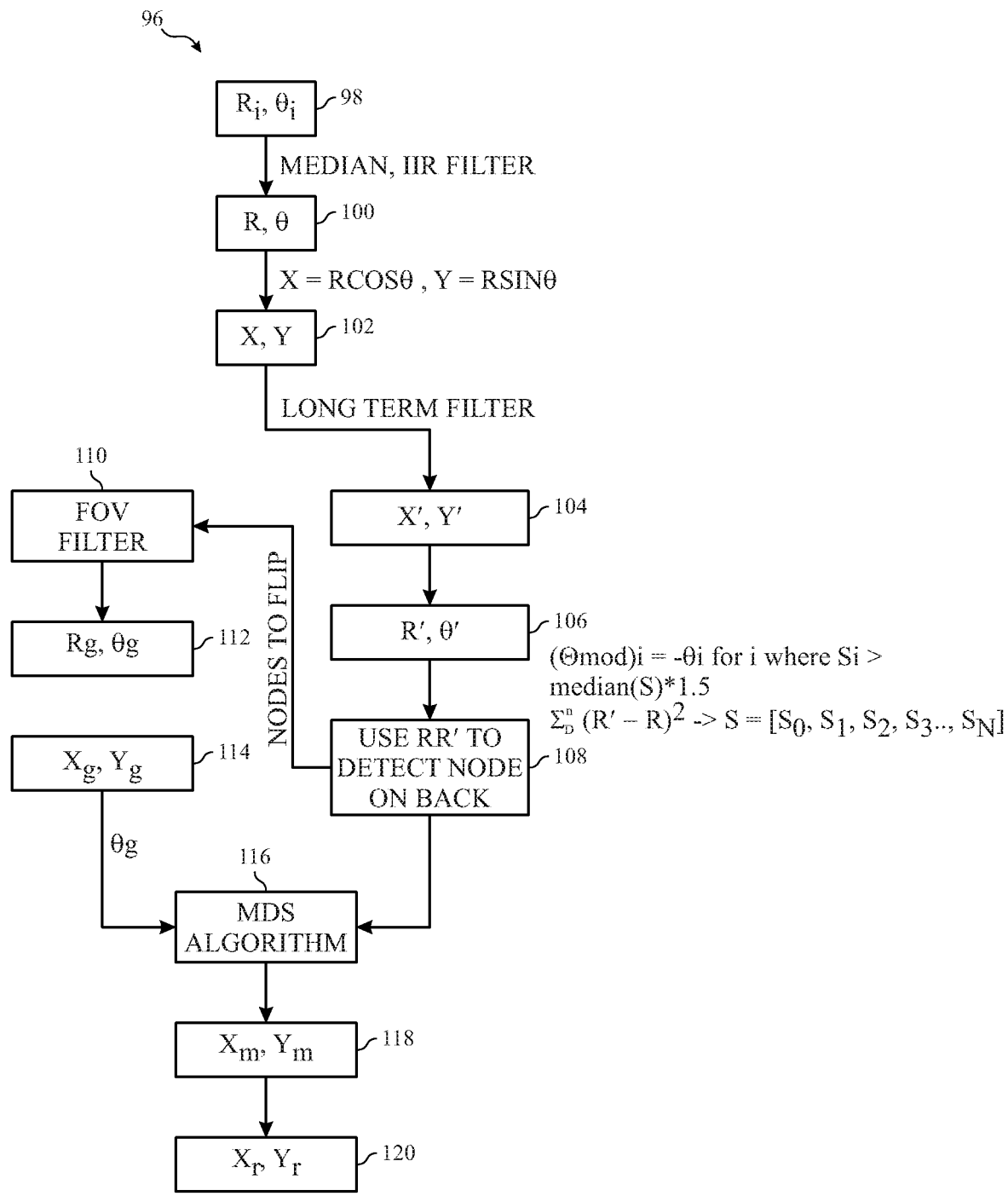
FIG. 10 is a flow diagram illustrating an embodiment of a process useful in correcting front-back ambiguity as part of an indoor localization and tracking technique, in accordance with an embodiment.

In certain embodiments, as illustrated in FIG. 10, the processor(s) 12 and/or the transceiver processor 50 of the electronic device 10 may execute a process 96 useful in correcting "front-back" ambiguity as part of the precise indoor localization and tracking techniques discussed herein. In certain embodiments, the process 96 may be a part of a precise indoor localization algorithm (PILA) that may be stored in the memory 14 of the electronic device 10, and executed, for example, by the processor(s) 12 and/or the transceiver processor 50 of the electronic device 10. That is, the process 96 may include code or instructions stored in a non-transitory machine-readable medium (e.g., the memory 14) and executed, for example, by the processor(s) 12 and/or the transceiver processor 50 of the electronic device 10.

In certain embodiments, the process 96 may begin with the processor(s) 12 and/or the transceiver processor 50 calculating range R and AoA θ matrices with respect to each of the other nodes 1, 2, 3, 4, and 5 (block 98). For example, in one embodiment, the processor(s) 12 and/or the transceiver processor 50 may calculate a range R matrix that may be expressed as:

$$\begin{bmatrix} R_{00} & R_{10} & R_{20} & R_{30} & \ldots & \ldots \\ R_{01} & R_{11} & R_{21} & R_{31} & \ldots & \ldots \\ R_{02} & R_{12} & R_{22} & R_{32} & \ldots & \ldots \\ R_{03} & R_{13} & R_{23} & R_{33} & \ldots & \ldots \\ \vdots & \vdots & \vdots & \vdots & \vdots & \vdots \\ \vdots & \vdots & \vdots & \vdots & \vdots & \vdots \end{bmatrix}$$

$Rxy = Ryx$ is the distance between $X$ and $Y$ nodes

For example, R00 may represent the range value of the node 92 ("Reference Node") with respect to itself (e.g., as a reference), while R01 may represent the range value between the node 92 ("Reference Node") and the node 82 (e.g., "Node 1"), and so forth and so on. Similarly, the processor(s) 12 and/or the transceiver processor 50 may calculate a AoA θ matrix that may be expressed as:

$$\begin{bmatrix} A_{00} & A_{10} & A_{20} & A_{30} & \ldots & \ldots \\ A_{01} & A_{11} & A_{21} & A_{31} & \ldots & \ldots \\ A_{02} & A_{12} & A_{22} & A_{32} & \ldots & \ldots \\ A_{03} & A_{13} & A_{23} & A_{33} & \ldots & \ldots \\ \vdots & \vdots & \vdots & \vdots & \vdots & \vdots \\ \vdots & \vdots & \vdots & \vdots & \vdots & \vdots \end{bmatrix}$$

$A_{xy}$ is the angle between $X$ and $Y$ nodes measured from $y$

For example, A00 may represent the AoA value of the node 92 ("Reference Node") with respect to itself (e.g., as a reference), while A01 may represent the AoA value between the reference node and the node 1, and so forth and so on. In certain embodiments, the processor(s) 12 and/or the transceiver processor 50 may calculate the range and AoA matrices with respect to each of the other nodes 1, 2, 3, 4, and 5 to specifically correct and compensate for "front-back" ambiguity. For example, as will better appreciated with respect to the examples illustrated in FIGS. 12 and 13, the process 96 may allow the processor(s) 12 and/or the transceiver processor 50 to correct and compensate for "front-back" ambiguity based on, for example, a distance and/or an acceleration measurement derived from the calculated range and AoA matrices. For example, in one embodiment, the processor(s) 12 and/or the transceiver processor 50 may derive distance measurements from the calculated range matrix based on, for example, the Friis power transmission equation, which may be expressed as:

$$P_r = P_t \frac{G_t G_r \lambda_0^2}{(4\pi R)^2}$$

In equation (1), $P_r$ may represent, for example, the power level of the signal received (e.g., at the electronic device 10), while $P_t$ may represent, for example, the power level of the signal transmitted by one or more of the nodes 1, 2, 3, 4, and 5. Similarly, Gt may represent the gain of the signal received (e.g., at the electronic device 10), while Gr may represent, for example, the gain of the signal transmitted by one or more of the nodes 1, 2, 3, 4, and 5. Lastly, the term 1 may represent the free space wavelength, while R is the range (e.g., corresponding to the range values of the range matrix).

In certain embodiments, the process 96 may continue with the processor(s) 12 and/or the transceiver processor 50 filtering (block 100) the range and AoA matrices (e.g., via one or more infinite impulse response [IIR] filters) calculated at block 98 to quantized the range and AoA matrices. The process 96 may continue with the processor(s) 12 and/or the transceiver processor 50 generating (block 102) a set of distance points (e.g., XY coordinates) based on, for example, the range and AoA matrices calculated at block 98. For example, in certain embodiments, the processor(s) 12 and/or the transceiver processor 50 may convert polar coordinate distance values (e.g., represented in a 3-dimensional (3D) form) derived from the calculated range and AoA matrices into Cartesian coordinate values (e.g., represented in a 2-dimensional (2D) form) for the purposes of precision and accuracy. For example, the x and y rectangular coordinate values may be expressed as:

$x = r \cos \theta$ $y = r \sin \theta$

The process 96 may continue with the processor(s) 12 and/or the transceiver processor 50 performing a long-term filtering algorithm to generate a filtered distance coordinates matrix (e.g., X', Y') (block 104) and filtered range and AoA matrix (e.g., R', θ') (block 106). The process 96 may then continue with the processor(s) 12 and/or the transceiver processor 50 utilizing the range matrix R and the filtered range matrix R' (block 108) to accurately resolve the nodes 1, 2, 3, 4, and 5 as being from the backside of the reference node (e.g., "Reference Node" or electronic device 10). For example, in certain embodiments, the processor(s) 12 and/or the transceiver processor 50 may compare the range matrix R and the filtered range matrix R', and if the range matrix R and the filtered range matrix R' are determined to be very different, then one or more of the nodes 1, 2, 3, 4, and 5 may be determined as being on the backside of the reference node.

Specifically, in some embodiments, the processor(s) 12 and/or the transceiver processor 50 may compare the range matrix R and the filtered range matrix R' based on, for example, the following expressions:

$(\theta \bmod)_i = -\theta$ for $i$, where $S_i$ > median*1.5

$\Sigma_0^N (R' - R)^2 >> S = [S_0, S_1, S_2, S_3, \ldots S_{N-1}, S_N]$

As generally delineated by the above expressions, the range matrix R and the filtered range matrix R' are very different when Si is greater than or much greater than the median (S) times 1.5, where S is a particular node and i is a node index. Thus, when the above expressions are satisfied, the processor(s) 12 and/or the transceiver processor 50 may determine that one or more of the nodes 1, 2, 3, 4, and 5 are on the backside of the reference node. As further illustrated by the above expressions, the AoA of the one or more of the nodes 1, 2, 3, 4, and 5 resolved as being on the backside of the reference node may be negated.

In certain embodiments, the process 96 may continue with the processor(s) 12 and/or the transceiver processor 50 applying (block 110) field of view (FOV) filter based on the aforementioned expressions discussed with respect to block 108. For example, applying the FOV filter may be part of a sub-process to determine which of the one or more of the nodes 1, 2, 3, 4, and 5 are on the backside of the reference node to "flip" or correct for "flip-node" ambiguity. The process 96 may continue with the processor(s) 12 and/or the transceiver processor 50 generating a filtered distance coordinates matrix (e.g., Xg, Yg) (block 112) and filtered range and AoA matrix (e.g., Rg, θg) (block 114). The process 96 may continue with the processor(s) 12 and/or the transceiver processor 50 performing (block 116) a multidimensional scaling (MDS) algorithm to generate the corrected shape (e.g., corrected for "front-back" ambiguity and "flip-node" ambiguity) RF map of the nodes 1, 2, 3, 4, and 5 are on the backside of the reference node.

In certain embodiments, the process 96 may continue with the processor(s) 12 and/or the transceiver processor 50 generating (block 118) distance coordinate matrices (e.g., Xm, Yin) based on, for example, the MDS algorithm generated at block 116, in which $E_{m}$ Xm is the x-coordinate matrix of $m$ m eigenvectors and $\lambda_{m}$ Ym is the y-coordinate matrix of $m$ m eigenvectors. The process 96 may then conclude with the processor(s) 12 and/or the transceiver processor 50 generating (block 120) distance coordinate matrices (e.g., Xr, Yr) based on distance coordinate matrices (e.g., Xm, Ym) (block 118), in which $E_{m}$ Xr is the x-coordinate matrix of $m$ r real values and $\Lambda_{m}$ Yr is the y-coordinate matrix of $m$ r real values. $B$ Turning now to FIG. 11, a process 122 is illustrated that is useful in identifying "flipped" nodes as part of the precise indoor localization and tracking techniques discussed herein. It should be appreciated that, in some embodiments, the process 122 may be performed in conjunction, concurrently, or otherwise as part of a sub-process with respect to the process 96 discussed above in FIG. 10. Indeed, in certain embodiments, the process 122 may be a part of a precise indoor localization algorithm (PILA) that may be stored in the memory 14 of the electronic device 10, and executed, for example, by the processor(s) 12 and/or the transceiver processor 50 of the electronic device 10. For example, as illustrated by the process 122 in FIG. 11, the process 122 may begin with the processor(s) 12 and/or the transceiver processor 50 utilizing the calculated distance coordinate matrices (e.g., X, Y) (block 124), the calculated range and AoA matrices (e.g., R, θ) (block 126), the generated filtered distance coordinate matrices (e.g., X', Y') (block 128), and the generated filtered range and AoA matrices (e.g., R', θ') (block 130) to identify which of the nodes 1, 2, 3, 4, and 5 are resolved as being "flipped" with respect to their actual location.

In certain embodiments, the process 122 may continue with the processor(s) 12 and/or the transceiver processor 50 calculating (block 132) a difference between the range matrix R and the filtered range matrix R'. The process 122 may continue with the processor(s) 12 and/or the transceiver processor 50 calculating (block 134) maximum deviation node based on the difference between the range matrix R and the filtered range matrix R' calculated at block 132. For example, the node of the one or more nodes 1, 2, 3, 4, and 5 may indicate that that particular node is being resolved as "flipped." The process 122 may then conclude with the processor(s) 12 and/or the transceiver processor 50 negating (block 134) the AoA of the maximum deviation node, and identify the maximum deviation node as being a "flipped" node.

Figure 11:
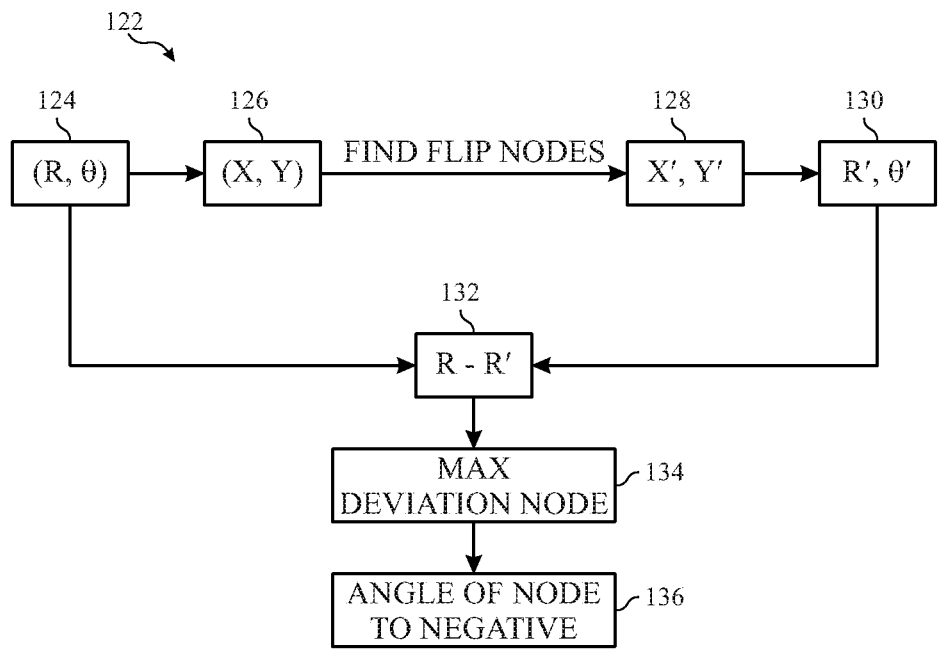
FIG. 11 is a flow diagram illustrating an embodiment of a process useful in identifying flipped nodes as part of an indoor localization and tracking technique, in accordance with an embodiment.
Figure 12:
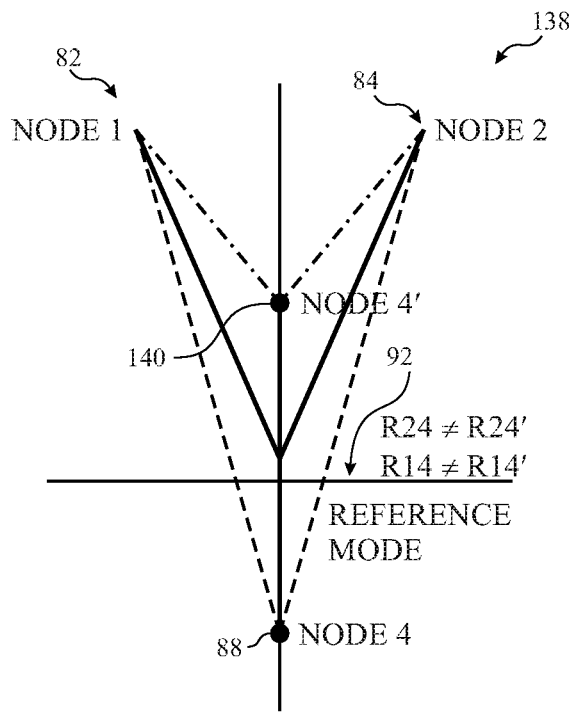
FIG. 12 illustrates an example of front-back signal detection based on a distance calculation, in accordance with an embodiment.

FIG. 12 illustrates an RF map example of the aforementioned techniques of correcting "front-back" ambiguity and "flip-node" ambiguity described with respect to FIGS. 10 and 11. As depicted by the RF map 138 illustrated in FIG. 12, the processor(s) 12 and/or the transceiver processor 50 may detect and calculate the location of the nodes 1, 2, and 4 as part of the calculated range and AoA matrices (e.g., R, θ) and calculate the node 140 (e.g., "Node 4") as part of the generated filtered range and AoA matrices (e.g., R', θ'). Based on the calculated range and AoA matrices (e.g., R, θ) and generated filtered range and AoA matrices (e.g., R', θ'), the processor(s) 12 and/or the transceiver processor 50 may determine that that the distance R24 is not equal to the distance R24', and that the distance R14 is not equal to the distance R14'. Thus, the processor(s) 12 and/or the transceiver processor 50 may determine that the node 4 is a "flipped" node, and resolve the actual location of the node 4 as being at the location of the node 4.

Figures 13, 14:
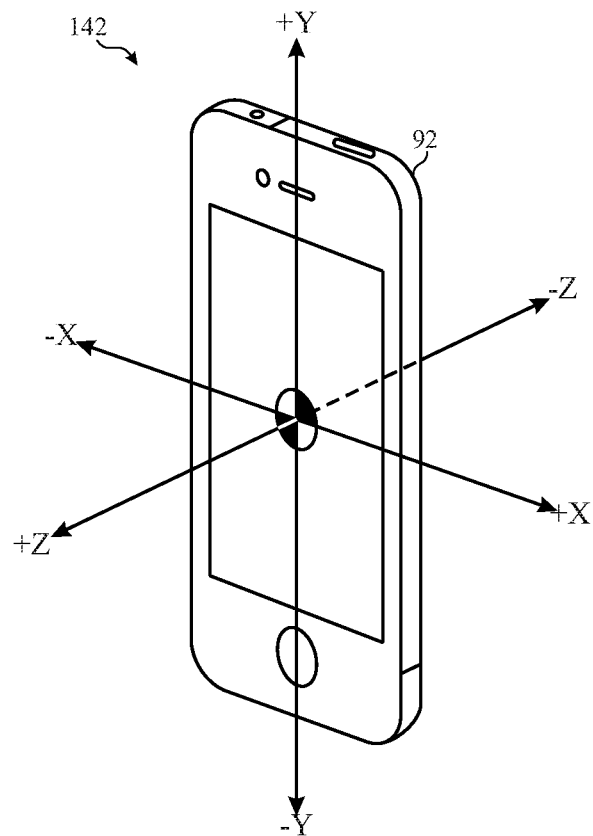
FIG. 13 illustrates an example of front-back signal detection based on an acceleration calculation, in accordance with an embodiment.
FIG. 14 illustrates a table corresponding to the acceleration based front-back signal detection of FIG. 13, in accordance with an embodiment.

FIGS. 13 and 14 illustrate examples of the aforementioned techniques of correcting "front-back" ambiguity and "flip-node" ambiguity described with respect to FIGS. 10 and 11 based on, for example, an acceleration calculation. As depicted by FIG. 13, the reference node may be positioned in a 3-dimensional (3-D) space (e.g., XYZ space) and the accelerometers, magnetometers, gyroscopes, and so forth of the electronic device 10 may be used to generate real value distance coordinate matrices (e.g., Xr, Yr), and, by extension, identify "front-back" and "flip-node" ambiguities.

For example, as illustrated by the table 144 in FIG. 14, the processor(s) 12 and/or the transceiver processor 50 may determine that as the distance from the reference node to one or more of the nodes 1, 2, 3, 4, and 5 increases in a positive direction with respect to the calculated acceleration vectors, the one or more nodes 1, 2, 3, 4, and 5 may represent a "flipped" node. As further depicted by the table 144, for all other cases, the processor(s) 12 and/or the transceiver processor 50 may determine that the one or more nodes 1, 2, 3, 4, and 5 have not been resolved as being "flipped".

Figure 15:
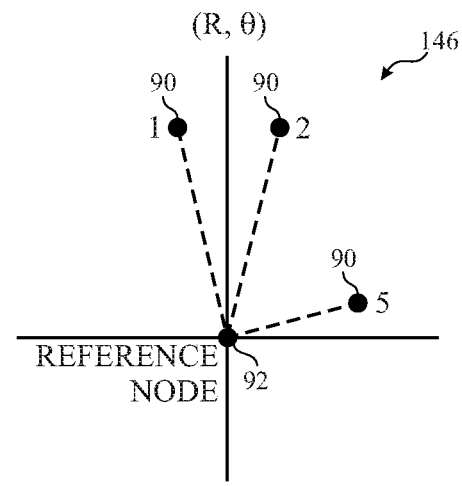
FIG. 15 is an example diagram of an RF map illustrating an RF map shape to correct for front-back ambiguity, in accordance with an embodiment.
Figure 16:
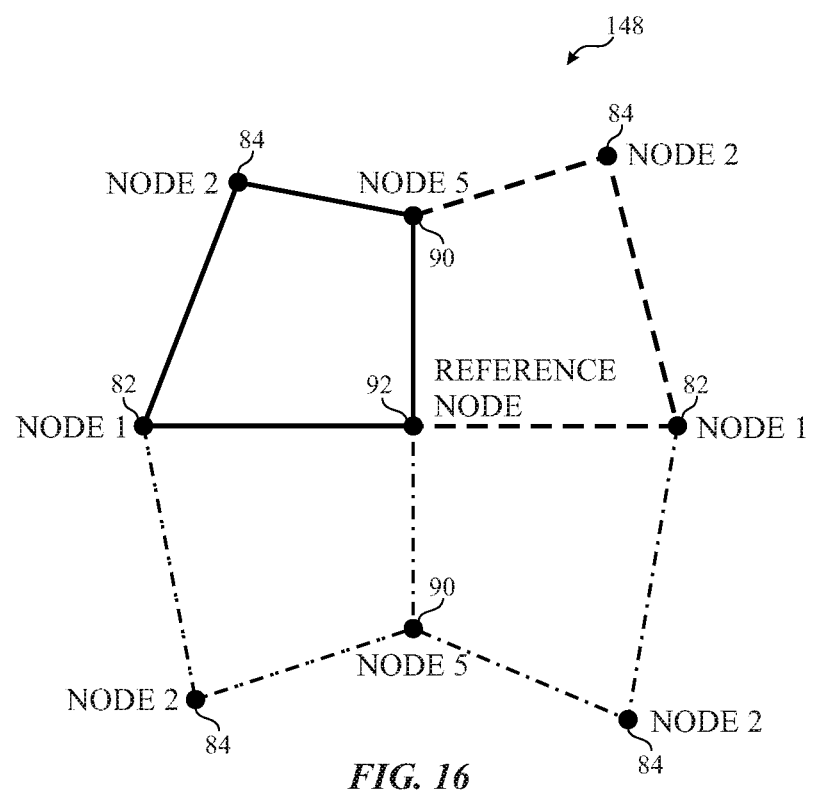
FIG. 16 is an example diagram of an RF map illustrating an RF map shape to correct front-back ambiguity, in accordance with an embodiment.

FIGS. 15-18 illustrate additional RF map examples of the aforementioned techniques of correcting "front-back" ambiguity and "flip-node" ambiguity described with respect to FIGS. 10 and 11, and more specifically, illustrations of how the previously discussed MDS algorithm is used to construct an RF map adjusted and corrected for "front-back" ambiguity and/or "flip-node" ambiguity. For example, FIG. 15 illustrates an RF map 146 of an example layout (e.g., the actual physical arrangement and respective locations) of nodes 1, 2, and 5 that may be placed or situated within an indoor environment (e.g., inside of residential, commercial, or industrial buildings) generated based on, for example, the calculated range and AoA matrices (e.g., R, θ) with respective distances from the reference node. FIG. 16 illustrates an RF map 148 generated after the aforementioned MDS algorithm is applied, and thus the shape of the RF map 148 is constructed to generate four possible shapes of the RF map 148 corresponding to the actual arrangement of the nodes 1, 2, and 5.

In certain embodiments, the processor(s) 12 and/or the transceiver processor 50 may determine which of the four possible shapes of the RF map 148 to select and rotate to match (or to best match) the actual arrangement of the nodes 1, 2, and 5, as illustrated by the RF map 148 of FIG. 15. For example, as illustrated by the RF map 150 of FIG. 17, the processor(s) 12 and/or the transceiver processor 50 may determine the precise rotation (or the best possible rotation) of the selected shape of the four possible shapes of, for example, the RF map 148 of FIG. 16. Specifically, the processor(s) 12 and/or the transceiver processor 50 may determine the precise rotation (or the best possible rotation) of the selected shape based on, for example, the calculated AoA matrix (e.g., θ).

Figure 17:
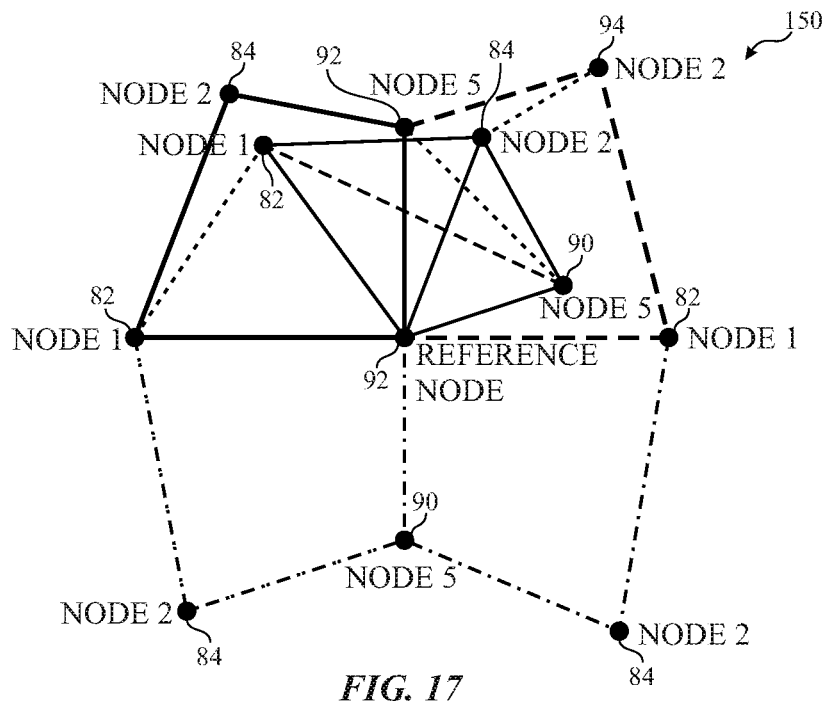
FIG. 17 is an example diagram of another RF map illustrating an RF map shape with corrected front-back ambiguity, in accordance with an embodiment.
Figure 18:
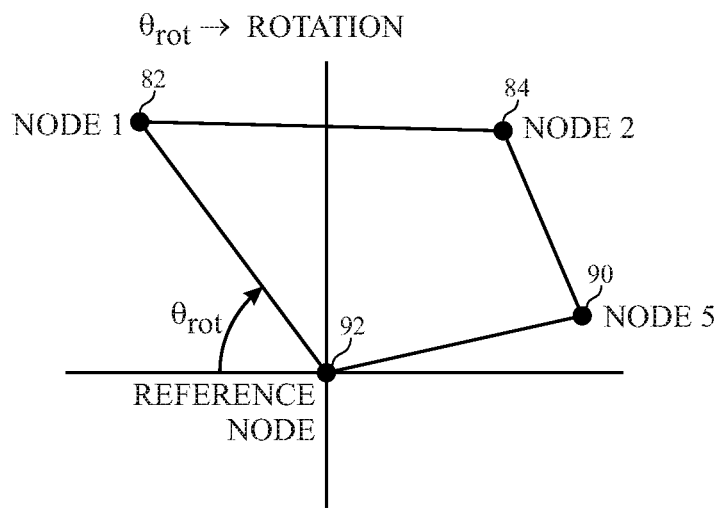
FIG. 18 is an example diagram of another RF map illustrating an RF map shape with corrected front-back ambiguity, in accordance with an embodiment.

For example, as illustrated by the RF map 152 of FIG. 18, after the MDS algorithm is applied and the shape of the RF map 150 is rotated by an angle rot, the resulting shape (e.g., semi-parallelogram shape as illustrated) of the RF map 150 of FIG. 17 is the RF map 152 of FIG. 18. As it may be appreciated, the RF map 152 of FIG. 18 corresponds to the actual arrangement of the nodes 1, 2, and 4 as first illustrated with respect to FIG. 15. In this way, the processor(s) 12 and/or the transceiver processor 50 may determine the actual location of the nodes 1, 2, and 5 by correcting and adjusting for "front-back" ambiguity and "flip-node" ambiguity.

Figure 19:
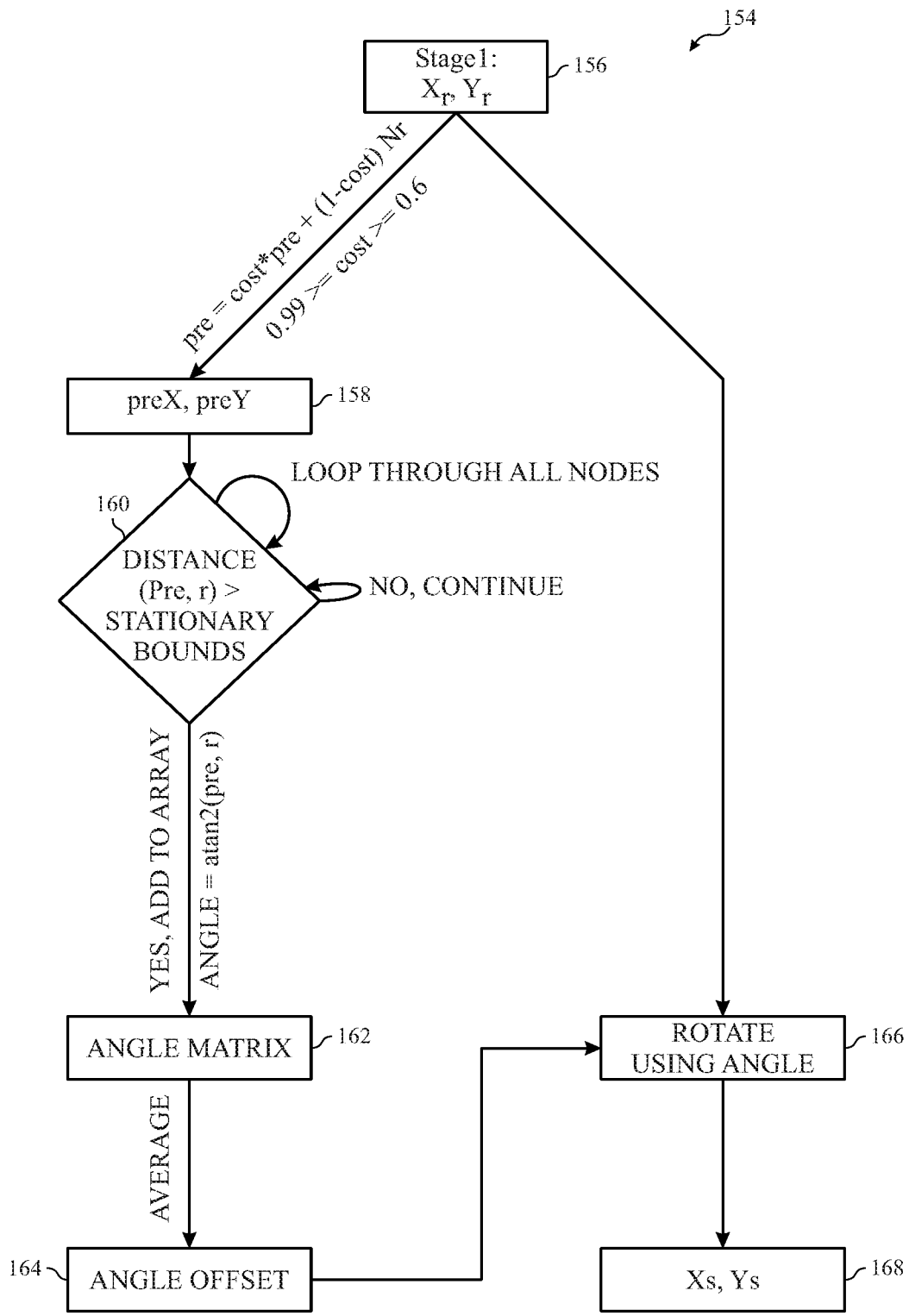
FIG. 19 is a flow diagram illustrating an embodiment of a process useful in correcting front-back ambiguity as part of an indoor localization and tracking technique, in accordance with an embodiment.

Turning now to FIG. 19, which illustrates a process 154 useful in determining stationary versus moving nodes as part of the precise indoor localization and tracking techniques discussed herein. The process 154 may be a part of a precise indoor localization algorithm (PILA) that may be stored in the memory 14 of the electronic device 10, and executed, for example, by the processor(s) 12 and/or the transceiver processor 50 of the electronic device 10. In certain embodiments, the process 154 may include a stationary filtering process to identify stationary versus moving nodes 1, 2, 3, 4, and 5.

As illustrated by the process 154 in FIG. 19, the process 154 may begin with the processor(s) 12 and/or the transceiver processor 50 utilizing (block 156) the calculated distance coordinate matrices (e.g., Xr, Yr) (e.g., previously calculated as part of the process 122 of FIG. 11) to tune the $E_{m}$Xr matrix of $m$r real x-coordinates values and $\Lambda_{m}$Yr matrix of $m$r real y-coordinates values and generate stationary bounds preX, preY (block 158) for each of the nodes 1, 2, 3, 4, and 5.

For example, in certain embodiments, the processor(s) 12 and/or the transceiver processor 50 may generate stationary bounds that may be expressed as:

pre=cos $t$*pre+(1−cos $t$)$N_r$, where 0.6≤cos $t$≤0.99

In certain embodiments, the processor(s) 12 and/or the transceiver processor 50 may generate XY stationary bounds for each of the nodes 1, 2, 3, 4, and 5, such that if the processor(s) 12 and/or the transceiver processor 50 determines that any of the nodes 1, 2, 3, 4, and 5 does not move outside of the stationary bounds preX, preY (e.g., for a period of time), then the nodes 1, 2, 3, 4, and 5 may be determined as being stationary. Indeed, in the above expression, pre may represent the original location of one or more of the nodes 1, 2, 3, 4, and 5, while Nr may represent the new location (e.g., potentially having been moved a distance from the original location).

In certain embodiments, the process 154 may continue with the processor(s) 12 and/or the transceiver processor 50 looping (decision 160) each of the nodes 82 (e.g., "Node 1"), 84 (e.g., "Node 2"), 86 (e.g., "Node 3"), 88 (e.g., "Node 4"), 90 and (e.g., "Node 5") through the stationary bounds preX, preY. As depicted by decision 160, the processor(s) 12 and/or the transceiver processor 50 may perform a for-loop function in which the processor(s) 12 and/or the transceiver processor 50 may loop through iterations until one or more of the nodes 1, 2, 3, 4, and 5 are determined to be outside of the stationary bounds preX, preY.

In certain embodiments, once one or more of the nodes 1, 2, 3, 4, and 5 is determined to be outside of the stationary bounds preX, preY, the process 154 may continue with the processor(s) 12 and/or the transceiver processor 50 adding (block 162) the angle of the one or more nodes to the previously calculated AoA matrix (e.g., 0). The process 154 may then continue with the processor(s) 12 and/or the transceiver processor 50 applying a long term average of the updated AoA matrix (e.g., 0) and generating an angle offset (block 164) based thereon. The process 154 may then continue with the processor(s) 12 and/or the transceiver processor 50 rotating (block 166) the shape of the generated RF map based on the $E_{m}$Xr matrix of $m$r real x-coordinates values and $\Lambda_{m}$Yr matrix of $m$r real y-coordinates values (e.g., from block 156) and the angle offset generated at block 164. The process 154 may then conclude with the processor(s) 12 and/or the transceiver processor 50 generating stationary distance coordinate matrices (e.g., Xs, Ys), and, by extension, identify which of the nodes 1, 2, 3, 4, and 5 are stationary.

Figure 20:
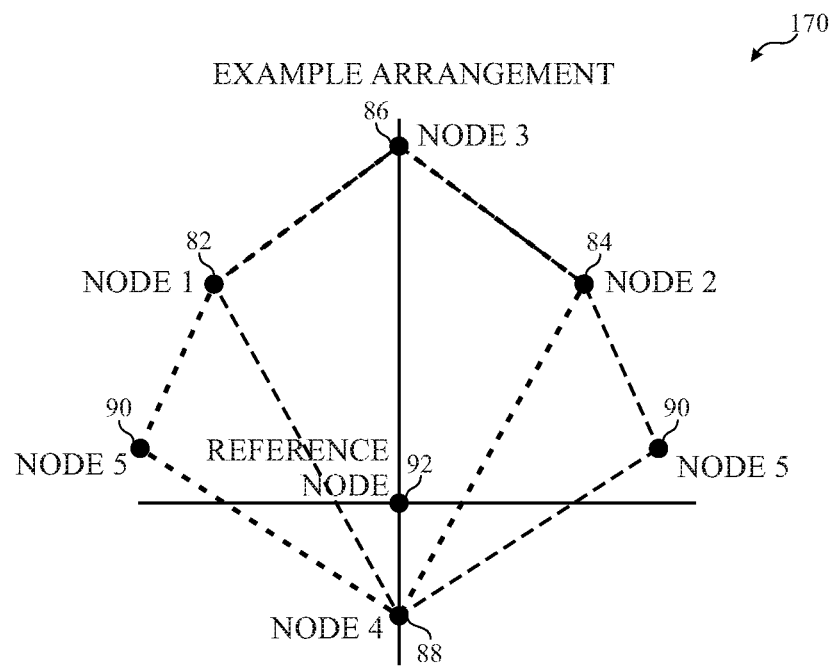
FIG. 20 is an example diagram of RF map illustrating field-of-view (FOV) filtering, in accordance with an embodiment.
Figure 21:
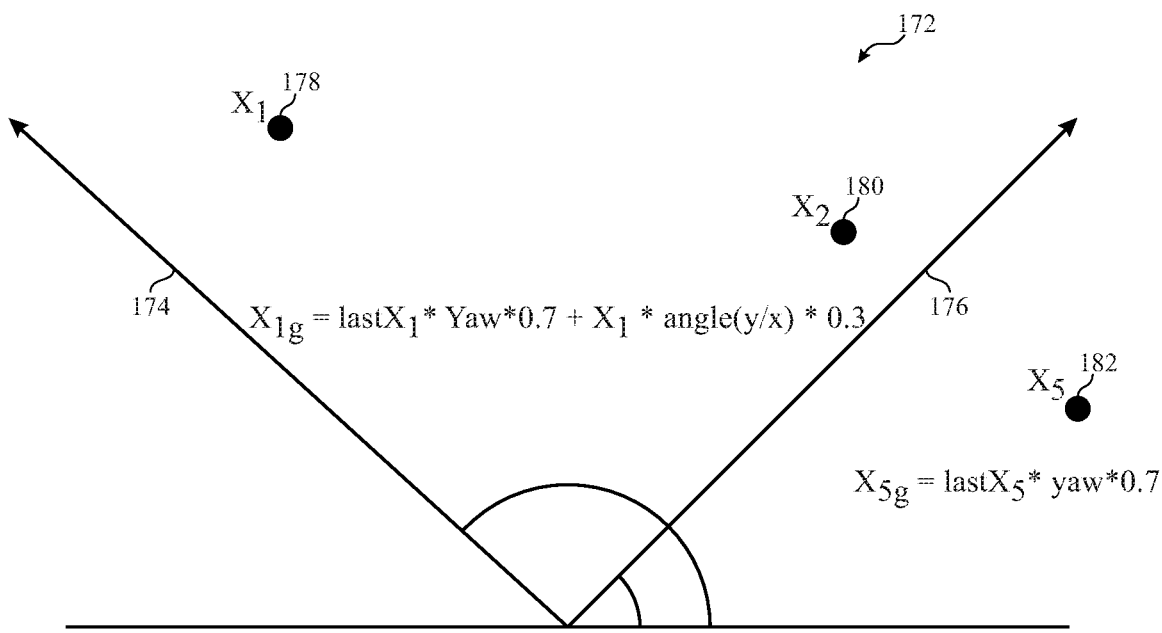
FIG. 21 is plot diagram illustrating field-of-view (FOV) filtering, in accordance with an embodiment.

As an example of the process 154 described with respect to FIG. 19, FIG. 20 illustrates an RF map 170 of an example layout (e.g., the actual physical arrangement and respective locations) of nodes 1, 2, and 5 that may be placed or situated within an indoor environment (e.g., inside of residential, commercial, or industrial buildings). FIG. 21 depicts a plot 172 illustrating an application of FOV filter, in which the arrows 174 and 176 may, in one embodiment, represent the calculated stationary bounds preX and preY, respectively. The plot 172 illustrates that the node 178 (e.g., "X1" corresponding to the node 82 in FIG. 20) and the node 180 (e.g., "X2" corresponding to the node 84 in FIG. 20) are each within the bounds indicated by the arrows 174 and 176.

On the other hand, the node 182 (e.g., "X5" corresponding to the node 90 in FIG. 20) may be detected as being outside of the bounds indicated by the arrows 174 and 176. In such a case, the AoA of the node 182 may not be "trusted" as being accurate, and thus the processor(s) 12 and/or the transceiver processor 50 may correct for movement of the node 182 utilizing the MDS algorithm and the illustrated yaw calculations to correct for AoA variations.

Figure 22:
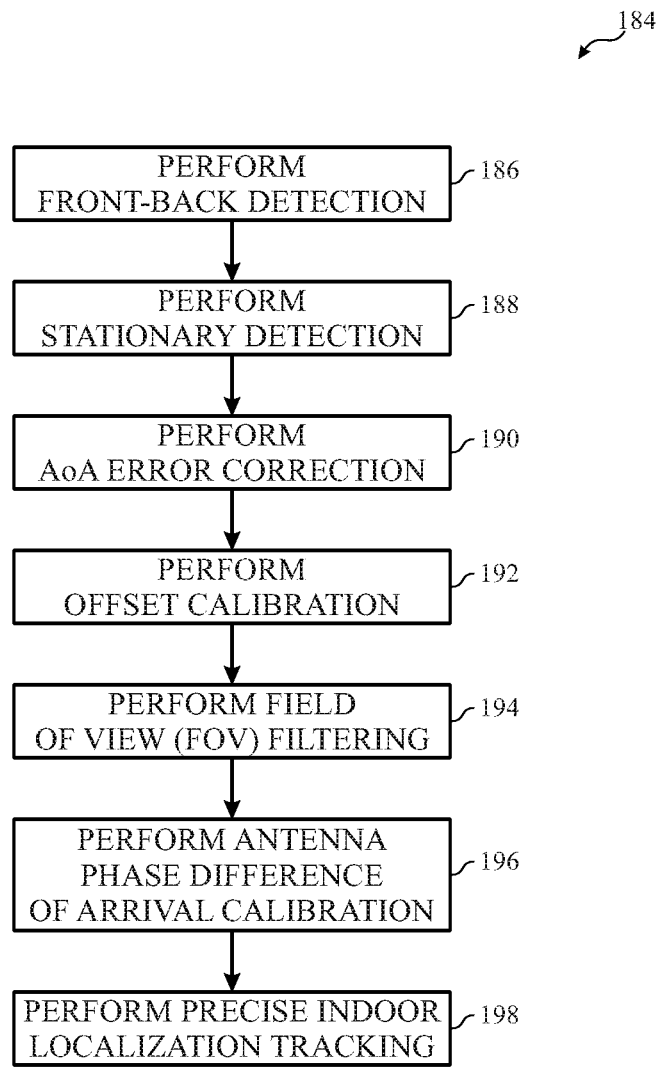
FIG. 22 is a flow diagram illustrating an embodiment of a process useful in performing precise indoor localization and tracking, in accordance with an embodiment.

Turning now to FIG. 22, a flow diagram is presented, illustrating an embodiment of a process 184 useful in performing precise indoor localization and tracking of various electronic devices. It should be appreciated that, in some embodiments, the process 184 may, at least in some embodiments, include an aggregation of the process 98, the process 122, and the process 154 previously discussed with respect to FIGS. 10, 11 and 19. In certain embodiments, the process 184 may include a precise indoor localization algorithm (PILA) that may be stored in the memory 14 of the electronic device 10, and executed, for example, by the processor(s) 12 and/or the transceiver processor 50 of the electronic device 10.

In certain embodiments, the process 184 may begin with the processor(s) 12 and/or the transceiver processor 50 performing (block 186) front-back node detection. The process 184 may then continue with the processor(s) 12 and/or the transceiver processor 50 performing (block 188) stationary node detection. The process 184 may then continue with the processor(s) 12 and/or the transceiver processor 50 performing (block 190) angle of arrival (AoA) error correction. For example, if the yaw calculations of the nodes 1, 2, 3, 4, and 5 changes, for example, by +−20° (e.g., indicating that one or more of the nodes 1, 2, 3, 4, and 5 have moved) the new AoA measurement is expected to change by 20 degrees +−20°. If such is not the case, longer term averages of the possible error can be computed and applied to compensate for AoA errors when the nodes 1, 2, 3, 4, and move positions.

The process 184 may then continue with the processor(s) 12 and/or the transceiver processor 50 performing (block 192) angle offset calibration. The process 184 may then continue with the processor(s) 12 and/or the transceiver processor 50 performing (block 194) field of view (FOV) filtering. For example, in some embodiments in which antenna phase measurements began to deteriorate (e.g., when the nodes are far right (+80°) or far left (−80°) outside the FOV bounds), yaw calculations may be utilized to determine node angle, as the AoA may be inaccurate.

The process 184 may then continue with the processor(s) 12 and/or the transceiver processor 50 performing (block 196) antenna phase difference of arrival (PDOA) calibration. For example, in some embodiments, the antenna PDOA may be converted to AoA value to be initially input to the node 92 (e.g., "Reference Node" or electronic device 10). The process 184 may then conclude with the processor(s) 12 and/or the transceiver processor 50 performing (block 198) precise indoor localization and tracking of various wireless electronic devices.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device configured to perform a precise indoor localization algorithm (PILA), comprising:
one or more processors configured to:
generate a radio frequency (RF) map of a plurality of wireless electronic devices located and tracked within an indoor environment based at least in part on a calculated range matrix and a calculated angle of arrival (AoA) matrix, wherein the calculated range matrix comprises distance measurements based at least in part on power level of one or more signals received by the electronic device, the power level of one or more signals transmitted from the plurality of wireless electronic devices, gain of the one or more signals received by the electronic device, gain of the one or more signals transmitted by the plurality of wireless electronic devices, free space wavelength, range values, or a combination thereof;
adjust the RF map of the plurality of wireless electronic devices to compensate for a plurality of possible distortions with respect to a physical location of the plurality of wireless electronic devices within the indoor environment; and
generate an indication of the physical location of the plurality of wireless electronic devices within the indoor environment based at least in part on the adjusted RF map.

2. The electronic device of claim 1, wherein the calculated AoA matrix comprises AoA data of each of the plurality of wireless electronic devices with respect to the electronic device.

3. The electronic device of claim 1, wherein the plurality of possible distortions comprise front-back ambiguity.

4. The electronic device of claim 1, wherein the plurality of possible distortions comprise flipped node ambiguity.

5. The electronic device of claim 1, wherein the one or more processors are configured to adjust the RF map of the plurality of wireless electronic devices based on a determination of whether one or more of the plurality of wireless electronic devices are outside of bounds of a generated field of view (FOV) filter.

6. The electronic device of claim 1, wherein the one or more processors are configured to adjust the RF map of the plurality of wireless electronic devices by applying a multidimensional scaling (MDS) algorithm to generate a corrected shape of the RF map based at least in part on the calculated range matrix.

7. The electronic device of claim 1, wherein the one or more processors are configured to adjust the RF map of the plurality of wireless electronic devices by rotating a shape of the RF map based at least in part on the calculated AoA matrix.

8. A tangible, non-transitory, computer-readable medium having computer-executable code stored thereon, wherein the code comprises a precise indoor localization algorithm (PILA) including instructions that, when executed by one or more processors of a computer, cause the computer to:
locate and track a plurality of wireless electronic devices within an indoor environment; and
cause an electronic device to generate and adjust a radio frequency (RF) map of the plurality of wireless electronic devices based at least in part on a calculated range matrix and a calculated angle of arrival (AoA) matrix, wherein the RF map comprises an indication of a physical location of the plurality of wireless electronic devices within the indoor environment, and wherein the calculated range matrix comprises distance measurements based at least in part on power level of one or more signals received by the electronic device, the power level of one or more signals transmitted from the plurality of wireless electronic devices, gain of the one or more signals received by the electronic device, gain of the one or more signals transmitted by the plurality of wireless electronic devices, free space wavelength, range values, or a combination thereof.

9. The non-transitory computer-readable medium of claim 8, wherein adjusting the RF map of the plurality of wireless electronic devices is to compensate for a plurality of possible distortions with respect to the physical location of the plurality of wireless electronic devices within the indoor environment.

10. The non-transitory computer-readable medium of claim 9, wherein the plurality of possible distortions comprise flipped node ambiguity with respect to the physical location of each of the plurality of wireless electronic devices.

11. The non-transitory computer-readable medium of claim 10, wherein the flipped node ambiguity comprises adjusting the RF map by moving at least one of the plurality of wireless electronic devices from a left side location with respect to the electronic device on the RF map to a right side location with respect to the electronic device on the RF map.

12. The non-transitory computer-readable medium of claim 9, wherein the plurality of possible distortions comprises front-back ambiguity with respect to the physical location of each of the plurality of wireless electronic devices.

13. The non-transitory computer-readable medium of claim 12, wherein the front-back ambiguity comprises adjusting the RF map by moving at least one of the plurality of wireless electronic devices from a front side location with respect to the electronic device on the RF map to a backside location with respect to the electronic device on the RF map.

14. The non-transitory computer-readable medium of claim 8, wherein the code comprises instructions that, when executed by the one or more processors, cause the computer to:
adjust the RF map by applying a multidimensional scaling (MDS) algorithm to generate a corrected shape of the RF map; and
rotate the corrected shape of the RF map.

15. The non-transitory computer-readable medium of claim 14, wherein the corrected shape comprises reshaping the RF map to remove a front-back ambiguity, a flipped node ambiguity, or both.

16. The non-transitory computer-readable medium of claim 8, wherein the calculated AoA matrix comprises AoA data of each of the plurality of wireless electronic devices with respect to the electronic device.

17. A method, comprising:
generating a radio frequency (RF) map of a plurality of wireless electronic devices located and tracked within an indoor environment based at least in part on a calculated range matrix and a calculated angle of arrival (AoA) matrix with respect to an electronic device of the plurality of wireless electronic devices, wherein the calculated range matrix comprises distance measurements based at least in part on power level of one or more signals received by the electronic device, the power level of one or more signals transmitted from the plurality of wireless electronic devices, gain of the one or more signals received by the electronic device, gain of the one or more signals transmitted by the plurality of wireless electronic devices, free space wavelength, range values, or a combination thereof;
adjusting the RF map of the plurality of wireless electronic devices to compensate for a plurality of possible distortions with respect to a physical location of the plurality of wireless electronic devices within the indoor environment; and
generating an indication of the physical location of the plurality of wireless electronic devices within the indoor environment based at least in part on the adjusted RF map.

18. The method of claim 17, wherein the adjusting the RF map comprises correcting the plurality of possible distortions to accurately indicate actual positions of each of the plurality of wireless electronic devices with respect to the electronic device, by reshaping the RF map, wherein the possible distortions comprise front-back ambiguity, flipped node ambiguity, or a combination thereof.

* * * * *